(12) United States Patent
Cziraky et al.

(10) Patent No.: US 7,921,569 B2
(45) Date of Patent: Apr. 12, 2011

(54) TOOL ASSEMBLY APPARATUS HAVING A RECESSED TIP AND A METHOD FOR ITS USE

(75) Inventors: David A. Cziraky, Bethlehem, PA (US); Douglas F. Melville, Jr., Simsbury, CT (US); Paul Boxmeyer, Bristol, PA (US)

(73) Assignee: Crayola LLC, Easton, PA (US)

( * ) Notice: Subject to any disclaimer, the term of this patent is extended or adjusted under 35 U.S.C. 154(b) by 450 days.

(21) Appl. No.: 11/840,662

(22) Filed: Aug. 17, 2007

(65) Prior Publication Data

US 2008/0083121 A1 Apr. 10, 2008

Related U.S. Application Data

(60) Provisional application No. 60/838,741, filed on Aug. 18, 2006.

(51) Int. Cl.
*B26F 1/00* (2006.01)
(52) U.S. Cl. .............................. 30/358; 30/362; 30/367
(58) Field of Classification Search .................... 30/367, 30/366, 362, 277, 277.4, 392, 272.1, 358; 74/22 A, 25, 53–57
See application file for complete search history.

(56) References Cited

U.S. PATENT DOCUMENTS

| 990,006 | A | * | 4/1911 | Reading | 135/81 |
|---|---|---|---|---|---|
| 2,307,424 | A | * | 1/1943 | Savage | 30/277.4 |
| 2,390,371 | A | * | 12/1945 | Ivy | 30/358 |
| 2,529,895 | A | * | 11/1950 | Anderson | 30/359 |
| 3,315,356 | A | * | 4/1967 | Swanke et al. | 30/277.4 |
| 3,359,637 | A | * | 12/1967 | Hansen | 30/277.4 |
| 3,596,525 | A | * | 8/1971 | Niesz | 74/57 |
| 3,703,834 | A | * | 11/1972 | Beezer | 74/57 |
| 3,832,772 | A | * | 9/1974 | Sumida | 30/392 |
| 4,446,621 | A | * | 5/1984 | Peterson | 30/241 |
| 4,631,827 | A | * | 12/1986 | Moores | 30/277.4 |
| 4,712,625 | A | * | 12/1987 | Kress | 173/104 |
| 4,891,884 | A | * | 1/1990 | Torbet | 30/277.4 |

* cited by examiner

*Primary Examiner* — Boyer D. Ashley
*Assistant Examiner* — Omar Flores-Sánchez
(74) *Attorney, Agent, or Firm* — Shook, Hardy & Bacon LLP

(57) ABSTRACT

A tool assembly is disclosed that provides reciprocating motion to a tip of the assembly. The tool assembly has a drive assembly, a shaft assembly and a retraction mechanism contained within a housing. The tip of the shaft assembly protrudes from the housing during a portion of the stroke of the drive mechanism and upon disengagement of a motor of the drive assembly, the tip of the shaft assembly is recessed within the housing of the tool assembly.

12 Claims, 2 Drawing Sheets

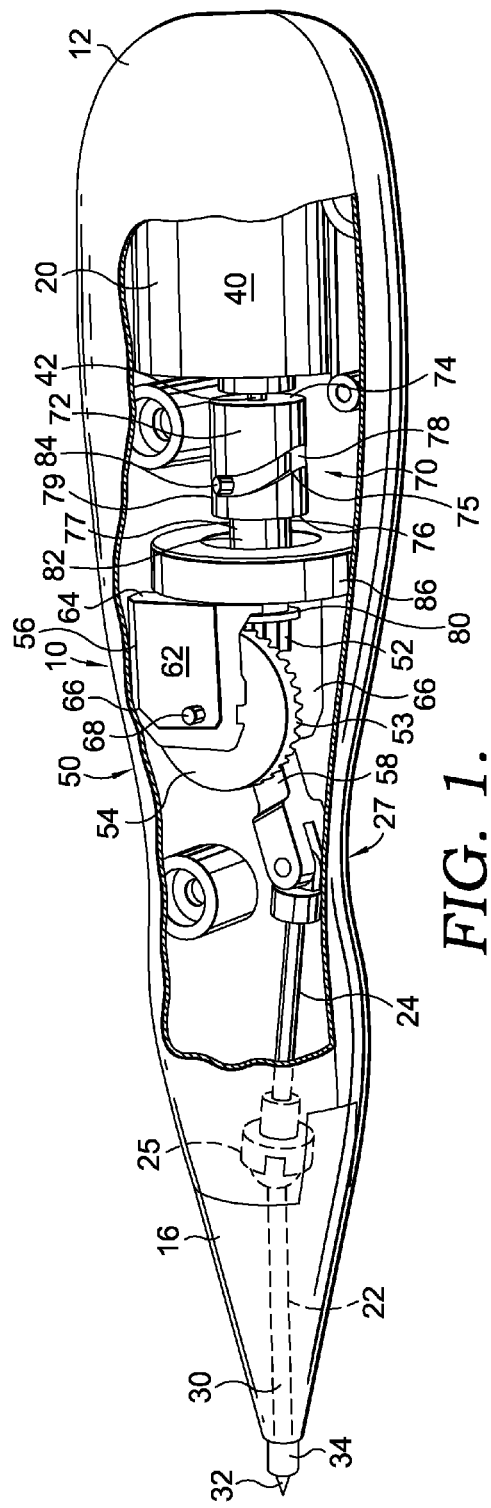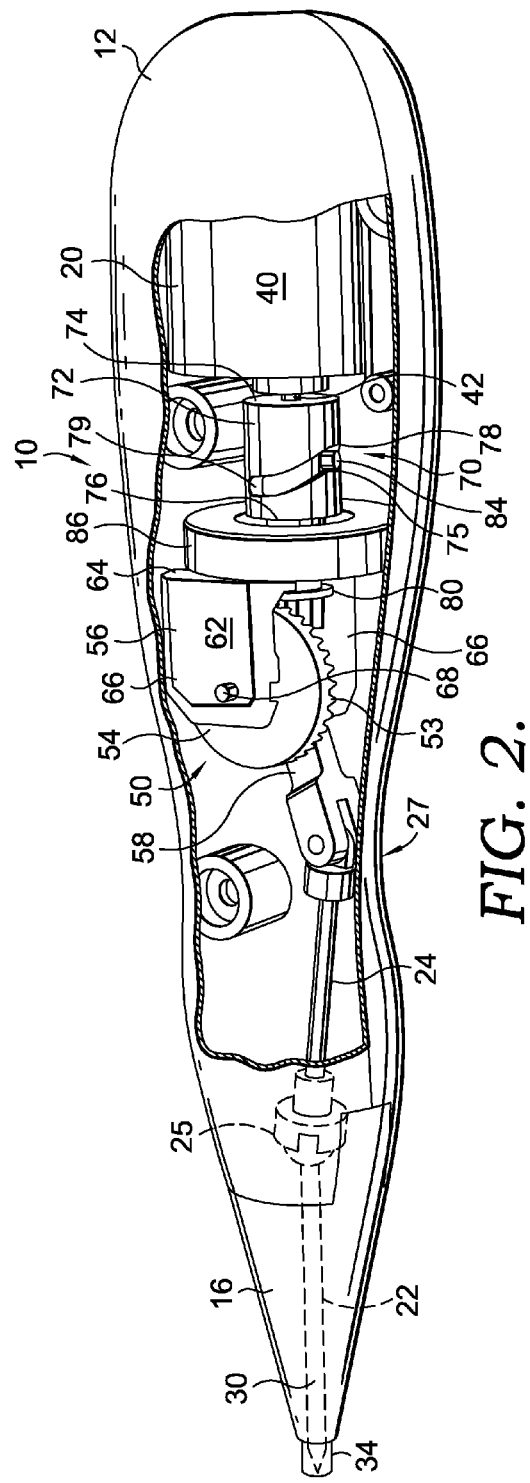

TOOL ASSEMBLY APPARATUS HAVING A RECESSED TIP AND A METHOD FOR ITS USE

CROSS-REFERENCE TO RELATED APPLICATIONS

This application claims the benefit of U.S. Provisional Application No. 60/838,741, filed on Aug. 18, 2006, which is incorporated herein by reference.

STATEMENT REGARDING FEDERALLY SPONSORED RESEARCH OR DEVELOPMENT

Not applicable.

BACKGROUND OF THE INVENTION

This invention relates to a tool assembly for use in cutting and forming various material. More specifically, the invention relates to an assembly to enable a child to cut different types of material and recesses the cutting tip when the tool is not in use.

Safety scissors are commonly used by children for cutting different types of material. Safety scissors, however, are difficult for children to effectively cut designs. Thus they may be frustrating for a child to use, especially a young child.

BRIEF SUMMARY OF THE INVENTION

Accordingly, the present invention provides a tool assembly that cuts and forms many types of material while remaining easy to use. The tool assembly has a drive assembly and a shaft assembly contained within a housing. The housing may be of various shapes and configurations, and the drive shaft contains a tip that protrudes in its outermost position from an opening in a lower portion of the housing. The drive assembly is operably configured such that the tip is recessed within the housing when the motor of the drive assembly is disengaged.

Additional advantages, and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views:

FIG. 1 is a cut-away view of the inner mechanism of the tool assembly of the present invention;

FIG. 2 is a cut-away view of the inner mechanism of the tool assembly of the present invention;

DETAILED DESCRIPTION OF THE INVENTION

Figure 3:
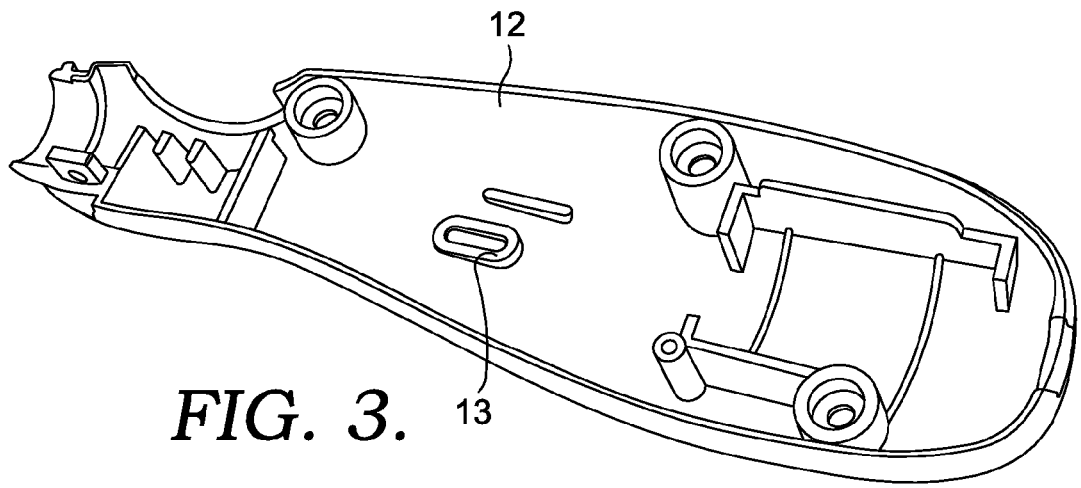
FIG. 3 is a perspective view of a portion of the housing.
Figure 4:
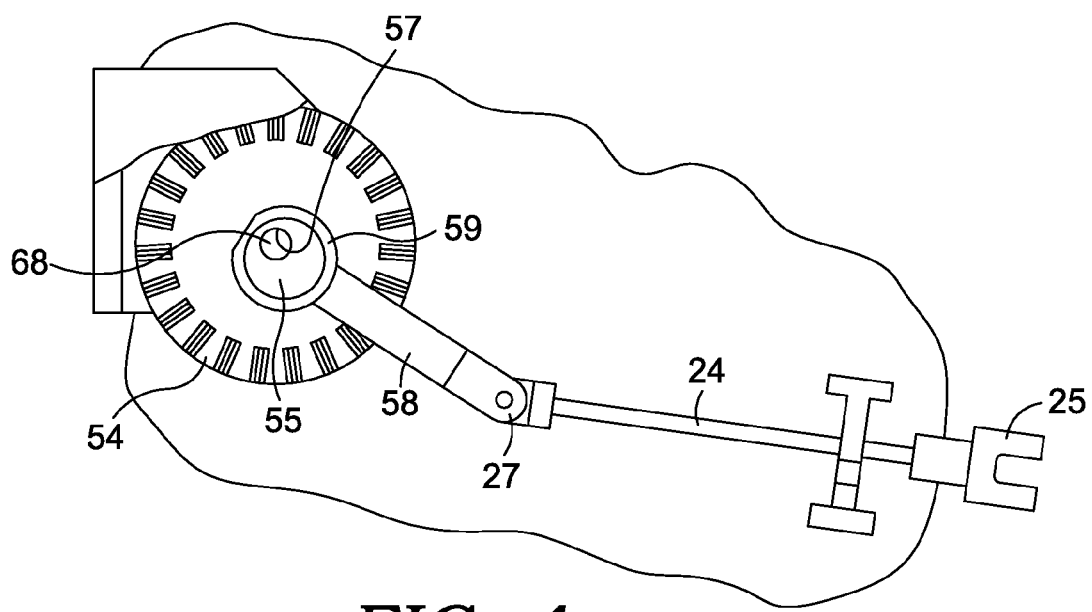
FIG. 4 is a side elevational view of a crown gear and output shaft of the present invention.

Referring to FIGS. 1-4 in greater detail, exemplary embodiment of a tool assembly for cutting and forming materials is shown generally at 10. The tool assembly includes a housing 12, a drive assembly 20, a tip assembly 22, and a link 24 to connect the drive assembly 20 to tip assembly 22.

The housing 12 may be of various shapes and sizes as will be discussed hereinafter. Tool housing 12 includes a pair of opposed channels 13 that extend longitudinally for a span and serve as guide tracks for a portion of the drive assembly as will be described in greater detail hereinafter. The lower portion of the housing 12 is formed with a removable tip member 16 having an opening 18 extending therethrough. The tip member may be secured through known fastening means, such as screws received in threaded apertures, to retain the tip member on the housing. The housing and tip member are preferably made of a durable, lightweight plastic.

The tip assembly 22 comprises a shaft 30 that includes a lower portion having a, cutting tip 32 protruding generally downwardly from the shaft. It will be understood that other tips, such as a forming tip may be substituted for a cutting tip. The tip assembly further includes a shaft guide 34, which is likewise preferably cylindrical and defines an aperture therethrough to receive reciprocating shaft 30. The shaft guide 34 is disposed proximate the removable tip 16 of the housing. It will be understood that the shaft guide may be integrally formed with the removable tip member 16.

The drive assembly 20 includes a motor 40 having an output axle such as pin shaft 42, a gear assembly 50 and a retraction means, generally indicated at 70. Motor 40 may be battery or electrically powered and is operably configured to minimize vibration of the housing. Preferably the motor is a 12 DC motor and includes a shaft brake (not shown), which may comprise any means for stopping the rotation of pin shaft 42 quickly after the power is disengaged. For example, the shaft brake could be mechanical, such as a piece of felt or other material pressing on the pin shaft 42, or electrical, such as a high value resistor.

The gear assembly 50 comprises a pinion or drive gear 52, crown gear 54, and a slidable gearbox housing assembly 56. Crown gear 52 includes a gear path 53 along its circumferential edge and an aperture 57 at its center of rotation. Drive gear 52 engages crown gear 48 at its gear path 53 and thereby transfers power thereto. Crown gear 54 further includes an output shaft 58 that is connected to a side surface of crown gear. In a preferred embodiment, the crown gear 54 includes a hub 55 projecting from one of the side surfaces of the gear. Aperture 57 of the crown gear extends through hub 55. The hub is offset from the center of rotation of the crown gear. Crown gear's 54 aperture extends through hub and is concentric with the axis of rotation of the crown gear 52 but not the center of rotation of the hub.

Output shaft 58 includes a collar 59 at one end that is operably configured to be slidably received on the hub 55. At the other end, output shaft 58 includes a yoke 61 for connection to one end of link 24 at connection 27. The shaft 30 of the tip assembly 22 is connected to the gear assembly 50 via link 24 through a ball-in-socket joint 25.

The gearbox housing assembly 56 includes a generally U-shaped housing 62 having a base wall 64 and two legs 66 extending therefrom. The U-shaped housing 62 surrounds both the crown gear 54 and pinion gear 52. The base wall 64 further includes a semi-circular cutout operably configured to fit onto a thrust bearing 80 which will be described in more detail hereinafter. The housing assembly 56 further includes a rod 68 that extends through both legs 66 of the gearbox housing 62 and through the aperture 57 of both the crown gear 54 and the hub 55. The rod 68 further extends externally of each leg 66 of the U-shaped housing 62. These externally extending portions of the rod 68 are configured to be received in the channels 13 of tool housing 12. As assembled, the channels 13 serve to secure the gearbox housing assembly 56 inside the housing 12 while permitting longitudinal movement of the gearbox housing assembly 56.

Retraction means 70 comprises a cam 72 that at a proximate end 74 is connected to and rotates with pin shaft 42 and at a distal end 76 is formed with a bore to receive a follower mechanism 77. Cam 72 includes a slot 75 extending transversely across the cam 72 and having a first end 79 and second end 78. The first end 79 of slot 74 is located longitudinally more proximate to the tip assembly 22 of the tool housing 12 than second end 78. The longitudinal distance that first end 79 and second end 78 are separated by is greater than the stroke of the tip assembly 22. The stroke of the tip assembly 22 is defined as twice the distance of the offset of the output shaft 58 from the center of crown gear 54.

The follower mechanism 77 comprises a collar 82 having a pin follower 84, the collar 82 being configured to be rotatably received in the distal end of cam 72. The pin follower 84 is mounted to collar 82 such that it extends transversely therefrom and is operably configured to be received in slot 74. The follower mechanism 77 further includes a shaft (not shown) extending longitudinally from the center of rotation of collar 82, and a flywheel 86 mounted on the shaft. The pinion gear 52 is mounted to the distal end of the shaft and the thrust bearing 80 is rotatably and slidably received on the shaft between the pinion gear 52 and collar 82.

In operation, when motor 40 is activated, the pin shaft 42 drives the cam 72 in a clockwise direction as viewed from the shaft 42 back to the motor 40. This causes slot 75 to move relative to pin follower 84 of the follower mechanism 77 until the first end 79 of the cam's slot 75 engages the pin follower 84, as shown in FIG. 1. As the cam 72 moves relative to the pin follower 84, both the pin follower 84 and the gear assembly 50 through thrust bearing 80 are shifted forward toward the tip 16 of the housing 12. The gear box housing assembly 56 slides in the channels 13 of the tool housing 12, which serve as guide tracks for the U-shaped housing 62. Once the pin follower 84 is engaged by the first end 79 of slot 74, the cam 72 drives the follower mechanism 77 and, in turn, drives pinion gear 52. As previously described, the pinion gear 52 transfers the power to crown gear 54, which rotates about its center to cause the offset output shaft 58 to reciprocate the tip assembly 22.

Upon the motor 40 being disengaged, the shaft brake stops the motor 40 and thus output shaft 42 and cam 72. The flywheel's 86 stored kinetic energy continues to drive the follower mechanism 77 and, in particular, collar 82 and pin follower 84. This causes pin follower 84 to travel from first end 79 to the second end 78 of slot 74, which, in turn, pulls the follower mechanism 77 and gear box housing assembly 56 through thrust bearing 80 back toward the motor 40 of the tool assembly 10, as shown in FIG. 2. The tip assembly 22, which is connected to the drive assembly 20 via the ball-in-socket joint of link 24, is retracted within the tip member 16 of the housing 12.

It is to be understood that the cutting tool assembly may include one or more tips that each are selectively removable from housing. Each tip performs different and are interchangeably mounteable to the housing.

All of these embodiments of a tool assembly may be used with an underlying board. The board may supply power to the cutting tool and may further be configured with grooves to facilitate cutting certain shapes, such as, for example, circles, spirals anatomical features, wings and fuselage, and moon shapes. The underlying board further is preferably plastic and may include means to secure the paper or other material to the board to secure the material thereon to facilitate the cutting of the material. In one means of securing the material, the underlying board may have an abraded or rough surface to hold the material to enhance the shearing of the material.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. A tool assembly for cutting materials comprising,
a housing having a distal end and a proximate end, a drive mechanism mounted in the housing and comprising a motor and a gearbox assembly, a tip coupled with the drive mechanism, the tip protruding from the distal end of the housing at least at some portion of a stroke of the drive mechanism, and a retraction mechanism for recessing the tip into the housing upon the motor being disengaged, the retraction mechanism comprising a cam and a follower mechanism, the cam being connected to and rotating with an output shaft from the motor and comprising a slot having a first end and second end extending transversely across the cam, the first end of slot being located closer to the distal end of the housing than second end, the follower mechanism engaging the slot.

2. The tool assembly of claim 1, wherein the follower mechanism comprises a collar having a pin follower mounted thereto and extending transversely therefrom, the pin follower being received in the slot of the cam.

3. The tool assembly of claim 2, wherein the collar is operably configured to be rotatably received in a distal end of the cam and includes a shaft extending longitudinally from the distal end.

4. The tool assembly of claim 3, wherein the follower mechanism further includes a flywheel mounted on the shaft of the collar.

5. The tool assembly of claim 4, wherein the gearbox assembly includes a pinion gear mounted to the shaft of the collar and a thrust bearing rotatably and slidably received on the shaft of the collar.

6. The tool assembly of claim 5, wherein the gearbox assembly drives the tip through a stroke, the longitudinal span between the first end and second end of the slot in the cam being greater than the stroke of the tip.

7. The tool assembly of claim 6, wherein the gearbox assembly further comprises a gearbox housing assembly and wherein the housing of the tool assembly further comprises a pair of opposed channels, the gearbox housing assembly being operably configured to be slidably received in the pair of opposed channels.

8. The tool assembly of claim 7, wherein the gearbox housing assembly is further mounted to the thrust bearing whereby when output shaft of the motor drives the cam thereby causing slot of the cam to move relative to pin follower of the follower mechanism until the first end of the slot engages the pin follower, the pin follower and the gear assembly through thrust bearing are shifted forward toward the distal end of the housing of the tool assembly with the gear box housing assembly sliding in the channels of the tool housing and whereby upon disengagement of the motor, output shaft and cam stop rotating and the flywheel continues to drive the collar and pin follower causing the pin follower to travel from first end to the second end of slot which retracts the follower mechanism and gear box housing assembly through thrust bearing toward the proximal end of the tool assembly thereby retracting the tip within the housing.

9. A tool assembly having a recessible and reciprocating tip, the tool assembly comprising:
- a housing having a distal end and a proximate end;
- a motor having an output shaft, the motor being mounted in the housing;
- a gearbox assembly coupled to the output shaft of the motor, the gearbox assembly translating the rotational drive of the output shaft into a reciprocating motion having a stroke;
- a tip assembly coupled with the gearbox assembly, the tip assembly including a tip end protruding from the distal end of the housing at least at some portion of the stroke of the gearbox assembly mechanism; and
- a retraction mechanism comprising a cam and a follower mechanism for recessing the tip into the housing upon the motor being disengaged,
- wherein the cam is connected to and rotates with an output shaft from the motor and the cam comprises a slot having a first end and second end extending transversely across the cam, the first end of slot being located closer to the distal end of the housing than the second end, the follower mechanism comprising a collar having a pin follower mounted thereto and extending transversely therefrom, the pin follower being received in the slot of the cam.

10. The tool assembly of claim 9, wherein the collar is operably configured to be rotatably received in a distal end of the cam and includes a shaft extending longitudinally from a distal end of the cam, and wherein the follower mechanism further includes a flywheel mounted on the shaft of the collar.

11. The tool assembly of claim 10, wherein the gearbox assembly includes a pinion gear to drive the gear assembly, the pinion gear being mounted to the shaft of the collar, the tool assembly further including a thrust bearing rotatably and slidably received on the shaft of the collar, the longitudinal span between the first end and second end of the cam being greater than the stroke of the gearbox assembly.

12. The tool assembly of claim 11, wherein the housing of the tool assembly further comprises a pair of opposed channels and wherein the gearbox assembly further comprises a gearbox housing operably configured to be slidably received in the pair of opposed channels, the gearbox housing further being mounted to a thrust bearing mounted on the shaft of the collar, whereby when output shaft of the motor drives the cam thereby causing slot of the cam to move relative to pin follower of the follower mechanism until the first end of the slot engages the pin follower, the pin follower and the gear assembly through thrust bearing are shifted forward toward the distal end of the housing of the tool assembly with the gear box housing assembly sliding in the channels of the tool housing and whereby upon disengagement of the motor, output shaft and cam stop rotating and the flywheel continues to drive the collar and pin follower causing the pin follower to travel from the first end to the second end of slot which retracts the follower mechanism and gear box housing assembly through thrust bearing toward the proximal end of the tool assembly thereby retracting the tip within the housing.

\* \* \* \* \*